(12) United States Patent
Shin et al.

(10) Patent No.: US 10,498,157 B2
(45) Date of Patent: Dec. 3, 2019

(54) CHARGING SYSTEM WITHOUT POWER FACTOR CORRECTION CIRCUIT

(71) Applicants: Hyundai Motor Company, Seoul (KR); Kia Motors Corporation, Seoul (KR); Seoul National University R&DB Foundation, Seoul (KR)

(72) Inventors: Ho Joon Shin, Gyeonggi-do (KR); Mu Shin Kwak, Gyeonggi-do (KR); Young Kook Lee, Seoul (KR); Sung Kyu Kim, Gyeonggi-do (KR); Jung Ik Ha, Seoul (KR); Yong Su Han, Daejeon (KR)

(73) Assignees: Hyundai Motor Company, Seoul (KR); Kia Motors Corporation, Seoul (KR); Seoul National University R&DB Foundation, Seoul (KR)

( * ) Notice: Subject to any disclaimer, the term of this patent is extended or adjusted under 35 U.S.C. 154(b) by 79 days.

(21) Appl. No.: 15/839,063

(22) Filed: Dec. 12, 2017

(65) Prior Publication Data
US 2019/0148965 A1 May 16, 2019

(30) Foreign Application Priority Data
Nov. 16, 2017 (KR) .......................... 10-2017-0153309

(51) Int. Cl.
| | |
|---|---|
| *H02J 7/02* | (2016.01) |
| *H02M 7/06* | (2006.01) |
| *H02M 1/42* | (2007.01) |
| *B60L 53/14* | (2019.01) |

(52) U.S. Cl.
CPC .............. *H02J 7/022* (2013.01); *B60L 53/14* (2019.02); *H02M 1/4233* (2013.01); *H02M 1/4258* (2013.01); *H02M 7/068* (2013.01)

(58) Field of Classification Search
CPC ...... H02J 7/022; H02M 1/4233; H02M 7/068; B60L 11/1816
USPC .......................................... 320/109, 158, 163
See application file for complete search history.

(56) References Cited

U.S. PATENT DOCUMENTS

| | | | |
|---|---|---|---|
| 2017/0072807 A1* | 3/2017 | Matsumoto ........... H02J 7/0055 |
| 2017/0229972 A1* | 8/2017 | Cerqueira Pinto Bezerra Varaj O ............... G01R 25/005 |

FOREIGN PATENT DOCUMENTS

| | | |
|---|---|---|
| KR | 10-1211234 B1 | 12/2012 |
| KR | 2013-0068411 A | 6/2013 |
| KR | 2014-0071593 A | 6/2014 |
| KR | 2015-0025598 A | 3/2015 |

* cited by examiner

*Primary Examiner* — Edward Tso
*Assistant Examiner* — Aaron Piggush
(74) *Attorney, Agent, or Firm* — Mintz Levin Cohn Ferris Glovsky and Popeo, P.C.; Peter F. Corless

(57) ABSTRACT

A charging system for improving a power factor and a current quality in a grid stage is provided. The charging system includes a rectifying circuit that is configured to rectify a grid power and a converter that is configured to receive a voltage-current rectified by the rectifying circuit and convert the voltage-current into a charge voltage-current to be provided to a battery. A capacitor is connected across a connection end of the rectifying circuit and the converter. The converter includes a first high frequency switching circuit, a transformer, and a second high frequency switching circuit.

8 Claims, 8 Drawing Sheets

CHARGING SYSTEM WITHOUT POWER FACTOR CORRECTION CIRCUIT

CROSS REFERENCE TO RELATED APPLICATION

The present application claims priority to Korean Patent Application No. 10-2017-0153309 field on Nov. 16, 2017, the entire contents of which is incorporated herein for all purposes by this reference.

BACKGROUND

Field of the Disclosure

The present disclosure relates generally to a charging system and, more particularly, to a charging system without a power factor correction circuit for improving a power factor and a current quality at a grid stage.

Description of the Related Art

Recently, research and development regarding environmentally friendly vehicles that reduce environmental pollution as much as possible have been conducted in the automobile industry and a market thereof has expanded. In particular, eco-friendly vehicle, electric vehicles, hybrid vehicles, and plug-in hybrid vehicles that utilize electric motors generating driving force using electric energy instead of engines generating driving force by burning conventional fossil fuels are being introduced. Typically, the eco-friendly vehicle technologies using such electric energy are used to drive the electric vehicle by charging the battery in the vehicle from a grid. Accordingly, an eco-friendly vehicle using electric energy is required to have an in-vehicle charging circuit for charging the battery with electric energy provided from the grid.

The in-vehicle charging circuit is implemented using various topologies as a circuit that is necessary for charging the battery of an environmentally friendly vehicle. However, most in-vehicle charging circuits include a high frequency transformer and filter for insulation, a plurality of switching elements, and a control module. In particular, the charging circuit has a built-in power factor correction circuit (PFC) to ensure a quality and a power factor of a grid current, satisfies requirements of the grid. Accordingly, the charging circuit will increase the price and volume of environmentally friendly vehicles, which results economic burden of consumers. In the related art, various research and development activities have been required to reduce the volume, weight, and cost of the in-vehicle charging circuit provided in an environmentally friendly vehicle.

It should be understood that the foregoing description of the background art is merely for the purpose of promoting an understanding of the background of the present disclosure and is not to be construed as an admission that the prior art is known to those skilled in the art.

SUMMARY

The present disclosure provides a charging system without a power factor correction circuit. The charging system ensures improved performance while eliminating a power factor correction circuit provided in an in-vehicle charging circuit to improve quality and power factor of a grid current.

In an aspect of an exemplary embodiment of the present disclosure, a charging system without a power factor correction circuit may include a rectifying circuit configured to rectify a grid power, a converter configured to receive a voltage-current rectified by the rectifying circuit and convert the voltage-current into a charge voltage-current to be provided to a battery and a capacitor connected across a connection end of the rectifying circuit and the converter. The converter may include a first high frequency switching circuit configured to convert the voltage-current rectified by the rectifying circuit into a high frequency signal, a transformer having a secondary-side coil to which the high frequency signal converted by the first high frequency switching circuit is input and a primary-side coil electromagnetically coupled to the secondary-side coil to generate and output the high frequency signal applied to the secondary-side coil based on a winding ratio, and a second high frequency switching circuit configured to convert the high frequency signal derived by the primary-side coil into a low frequency to be provided to the battery.

In some exemplary embodiments of the present disclosure, each of the first high frequency switching circuit and the second high frequency switching circuit may be a full-bridge circuit including a plurality of switching elements. In an exemplary embodiment of the present disclosure, the capacitor may be a film capacitor. An exemplary embodiment of the present disclosure may further include a controller configured to adjust switching duties of the first high frequency switching circuit and the second high frequency switching circuit.

In an exemplary embodiment of the present disclosure, the controller may be configured to operate the first high frequency switching circuit so that a voltage of the secondary-side coil may be calculated from the following equation:

$$V'_s = E'_s \sin(\omega_f t) = V_{dc} \frac{n_p}{n_s} \sin(\omega_g t)$$

wherein, $V_s$ denotes a voltage across the secondary-side coil, $V_s' = (n_p/n_s)*V_s$, $n_p$ denotes the number of windings of the primary-side coil, $n_s$ denotes the number of windings of the secondary-side coil, $V_{dc}$ denotes a voltage across the capacitor, $E_s$ denotes a peak value of a grid voltage, $E_s' = (n_p/n_s)*E_s$, $\omega_f$ denotes an operating frequency [rad/s] of the first high frequency switching circuit, and $\omega_g$ denotes a frequency [rad/s] of the grid voltage).

In an exemplary embodiment of the present disclosure, the controller may be configured to receive a charge power command value $P_s$ from a host controller and may derive $I_{ss}$, $I_{sc}$, $I_{ps}$, and $I_{pc}$ by applying the charge power command value $P_s$ and a predefined power factor $K_{pf}$ of a high frequency component generated by the first high frequency switching circuit to following Equations:

$$aI_{ss}^2 + bI_{ss} + c = 0$$

$$I_{ss} = \frac{-b - \sqrt{b^2 - 4ac}}{2a}$$

$$a = (2 - k_{pf}^2)\left(R'_s + \frac{R_p}{(\omega_f L_m)^2}(R'^2_s + (\omega_f L'_s)^2)\right)$$

$$b = \left(-\sqrt{1 - k_{pf}^2} \frac{2E'_s R_p \omega_f L'_s}{(\omega_f L_m)^2} - \frac{2E'_s R_p R'_s}{(\omega_f L_m)^2} - E'_s\right)$$

$$c = \frac{R_p E'^2_s}{(\omega_f L_m)^2} - \frac{4}{3}P_s$$

$$I_{sc} = -\sqrt{1 - k_{pf}^2} I_{ss}$$

wherein $R_p$ denotes a resistance component of the primary-side coil, $L_m$ denotes mutual inductance components of the primary-side coil and the secondary-side coil, $R_s$ denotes a winding resistance component of the secondary-side coil, $R_s'$ denotes a winding resistance component of the secondary-side coil converted to a primary side $[Rs'=(n_p/n_s)2*R_s]$, $V_s'$ denotes the voltage across the secondary-side coil converted to the primary side $[V_s'=(n_p/n_s)*V_s]$, $I_s$ denotes a secondary-side coil current, $I_s'$ denotes a secondary-side coil current converted to the primary side $[I_s'=(n_s/n_p)*I_s]$, $I_{ss}$ denotes a peak value of a sine component in $I_s'$, $I_{sc}$ denotes a peak value of a cosine component in $I_s'$, $I_p$ denotes a primary-side coil current, $I_{ps}$ denotes a peak value of a sine component in $I_p$, and $I_{pc}$ denotes a peak value of a cosine component in $I_p$).

In an exemplary embodiment of the present disclosure, the controller may be configured to generate a charge current command value for charging the battery using the derived $I_{ps}$ and $I_{pc}$, and adjust the switching duty of the second high frequency switching circuit to operate the voltage of the secondary-side coil of the transformer to allow a charge current corresponding to the charge current command value to be applied to the battery.

In an exemplary embodiment of the present disclosure, the controller may be configured to maintain a carrier phase difference of the first high frequency switching circuit and the second high frequency switching circuit at the maximum, adjust the voltage of the primary-side coil of the transformer to have twice a grid frequency, and output a square wave by alternately multiplying 1 and −1 for each switching frequency of the second high frequency switching circuit to generate a voltage command value of the primary-side coil of the transformer.

BRIEF DESCRIPTION OF THE DRAWINGS

The above and other objects, features and other advantages of the present disclosure will be more clearly understood from the following detailed description when taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referral to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, in order to make the description of the present disclosure clear, unrelated parts are not shown and, the thicknesses of layers and regions are exaggerated for clarity. Further, when it is stated that a layer is "on" another layer or substrate, the layer may be directly on another layer or substrate or a third layer may be disposed therebetween.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, a charging system without a power factor correction circuit according to a preferred embodiment of the present disclosure will be described with reference to the accompanying drawings.

Figure 1:
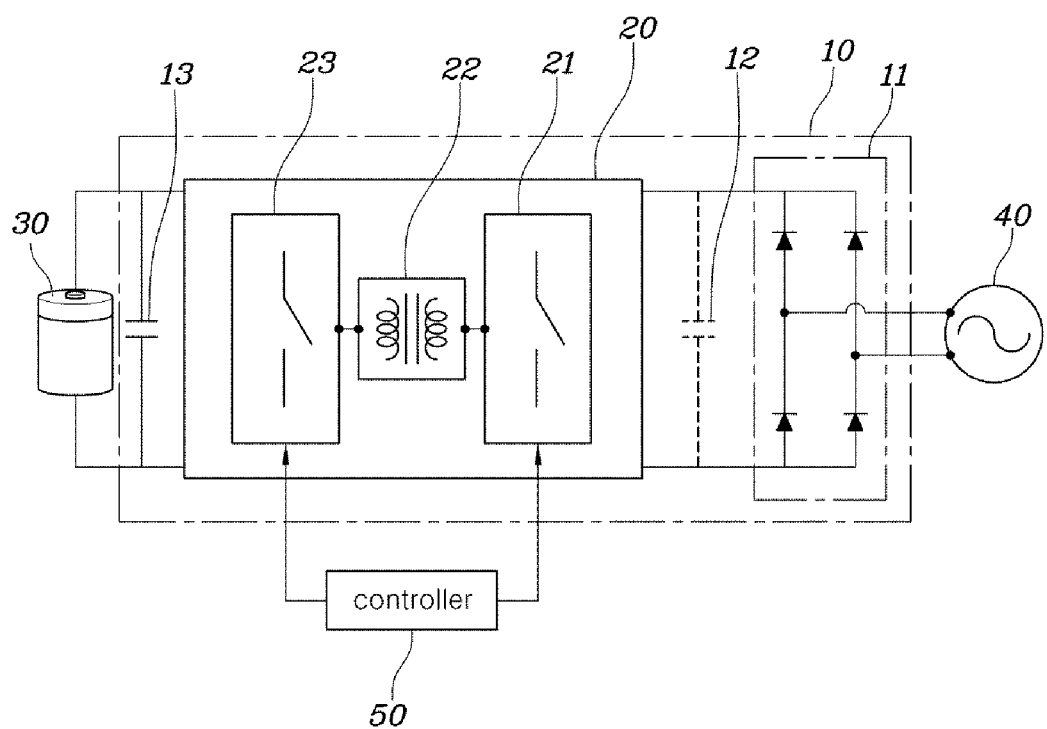
FIG. 1 is an exemplary circuit diagram illustrating a charging system without a power factor correction circuit according to an exemplary embodiment of the present disclosure.

FIG. 1 is an exemplary circuit diagram illustrating a charging system without a power factor correction circuit according to an exemplary embodiment of the present disclosure. Referring to FIG. 1, the charging system without a power factor correction circuit 10 according to an exemplary embodiment of the present disclosure may include a rectifying circuit 11 configured to rectify a grid power supply 40 and a converter 20 configured to convert a power rectified by the rectifying circuit 11 into charging power and then providing the charging power to a battery 30. In particular, a capacitor 12 having low capacity may be dispsoed in a grid-side input end of the converter 20 to allow the voltage rectified by the rectifying circuit 11 to be applied thereto.

The rectifying circuit 11 may be implemented by a full-wave rectifying circuit including four diodes. In an exemplary embodiment of the present disclosure, the capacitor 12 having low capacity may be disposed at an output end of the rectifying circuit 11 to allow the output voltage of the rectifying circuit 11 to be applied thereto. The capacitor 12 may be prevented from being used for a smoothing circuit that maintains the output voltage of the rectifying circuit 11 constant, but may have a reduced capacity to remove high frequency noise due to high frequency switching in the converter 20 that will be described later. Therefore, the capacitor 12 does not include an electrolytic capacitor for realizing a high capacity, but instead may include a film capacitor.

The converter 20 may include two high frequency switching circuits 21, 23 and a transformer 22 disposed between two high frequency switching circuits 21, 23. The first high frequency switching circuit 21 may be configured to convert the rectified power into a high frequency signal and apply the converted signal to an input-side coil of the transformer 22. The transformer 2 may be configured to output the high frequency signal applied to the input-side coil, to an output end coil magnetically coupled by forming a mutual inductance with the input-side coil. The second high frequency switching circuit 23 may be configured to convert the high frequency signal output to the output-side coil of the transformer 22 into a low frequency signal, and transfer the signal to the battery 30.

A grid power supply 40 may include an alternating current power (e.g., an AC power) supplied from an external source at a constant frequency, and the battery 30 may be an energy storage device configured to supply the power to drive an electric motor in environmentally friendly vehicle that includes an electric motor to generate a driving force to rotate the wheels. The controller 50 may be configured to receive a command value of the charging power input to the battery 30 and operate the high frequency switching circuits 21 and 23 to allow a charge voltage and a charge current capable of implementing the command value of the charging power to be provided to the battery 30.

Figure 2:
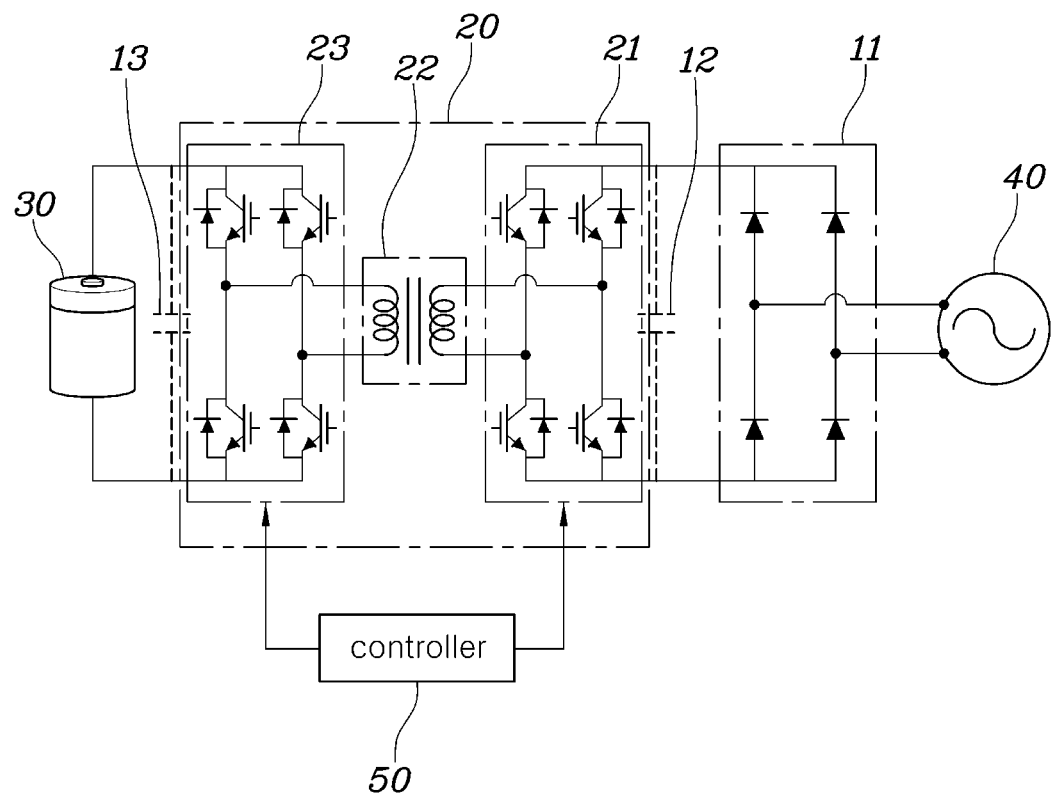
FIGS. 2 to 4 are exemplary circuit diagrams illustrating a charging system without power factor correction circuit according to an exemplary embodiment of the present disclosure.
Figure 3:
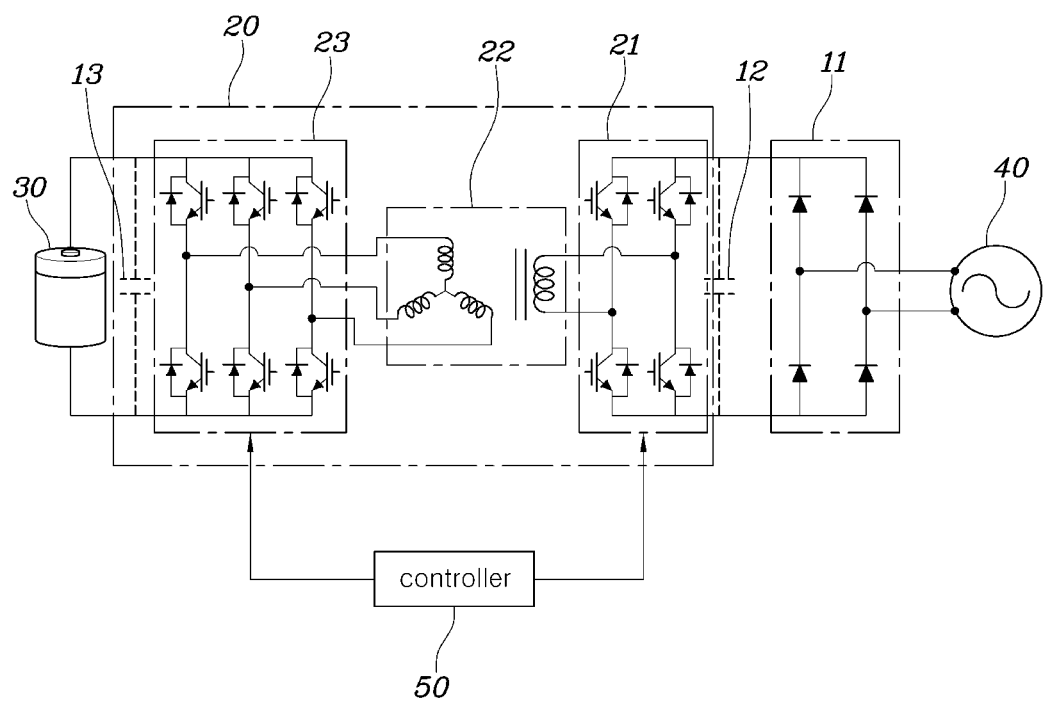
Figure 4:
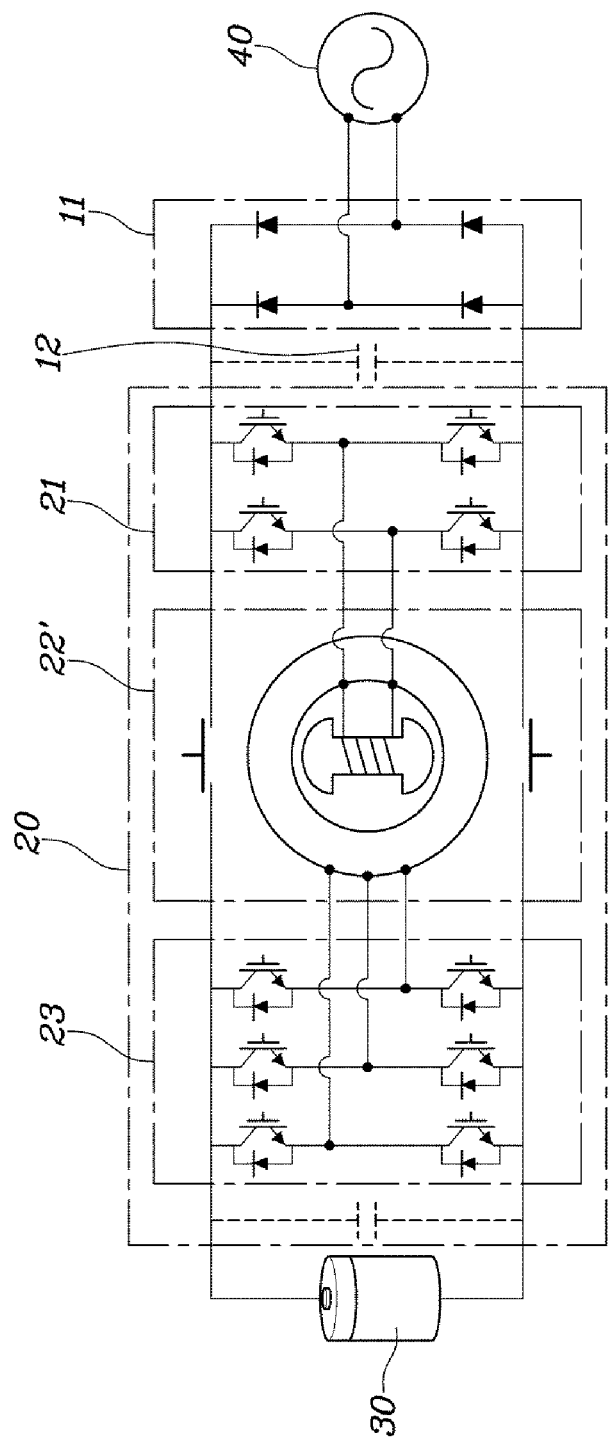

FIGS. 2 to 4 are exemplary detailed circuit diagrams illustrating a charging system without a power factor correction circuit according to exemplary embodiments of the present disclosure, and particularly show various examples of the converter 20. Referring to FIG. 2, with the converter 20 according to the exemplary embodiment of the present disclosure, the primary side (e.g., battery side) and the secondary side (e.g., rectifying circuit side) of the transformer 22 provided in the transformer 22 may be implemented in a form of single phase winding. The high frequency switching circuits 23 and 21 respectively connected to the primary side and the secondary side of the transformer 22 may be each implemented as an active full-bridge circuit that may include four switching elements.

Further, referring to FIG. 3, with the converter 20 according to the exemplary embodiment of the present disclosure, the primary side (e.g., battery side) of the transformer 22 provided therein may be implemented as a three phase windings and the secondary side (e.g., rectifying circuit side) provided therein may be implemented as a single-phase winding that may be electromagnetically connected to each of three phase windings Additionally, the high frequency switching circuit 23 connected to the primary side of the transformer 22 may be implemented as an active full-bridge circuit including a total of six switching elements each connected at an upper end and a lower end for each of three phase windings, The high frequency switching circuit 21 connected to the secondary side of the transformer 22 may be implemented having a plurality of (e.g., a total of four switching elements) switching elements connected to both ends of the single phase winding of the secondary side. As described above, according to an exemplary embodiment of the present disclosure, the converter 20 may include a structure including two active full-bridge circuits that may be referral to as a double active bridge (DAB).

Various exemplary embodiments of the present disclosure may allow the power supplied from the grid power supply 40 to be supplied to the battery 30 by operating the switching elements including the double active bridge, and may ensure quality and power factor of a grid current. In particular, in various exemplary embodiments of the present disclosure, the double active bridge may be configured to operate the switching elements to perform control for improving a shape of the grid current, as well as operations of conventional power transmission.

In particular, referring to FIG. 4, with an exemplary embodiment of the present disclosure, building a charging system without requiring a separate transformer by utilizing electromagnetic coupling due to a mutual inductance between a stator coil and a field coil of the winding synchronous motor 22' may be accomplished. In other words, the stator coil of the winding synchronous motor 22' may be the primary winding of the transformer, and the field coil may be the secondary winding of the transformer.

Since the system for driving the wounding synchronous motor 22' has been provided with the high frequency switching circuit 23 that converts the power of the battery 30 into three-phase alternating-current power and supplies the power to the stator coils of the winding synchronous motor and a bridge circuit for converting the power of the battery 30 to a single-phase alternating current and providing the power to the field coil, a converter may be omitted. Accordingly, the charging system may be implemented by preparing the diode rectifying circuit 11 and the capacitor 12 to connect the grid power supply 40 and the bridge circuit to the field coil. However, a relay R capable of electrically insulating the battery 30 and the bridge circuit 21 connected to the field coil at the time of charging may be included.

The operation of the charging system without a power factor correction circuit having the above-described circuit configuration will be described according to various exemplary embodiments of the present disclosure.

Figure 5:
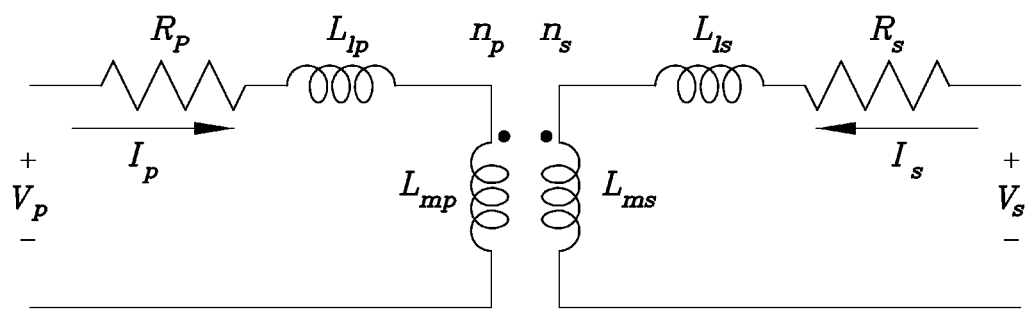
FIGS. 5 and 6 are exemplary circuit diagrams showing modeling of a transformer in a charging system without a power factor correction circuit shown in FIG. 2 according to an exemplary embodiment of the present disclosure.
Figure 6:
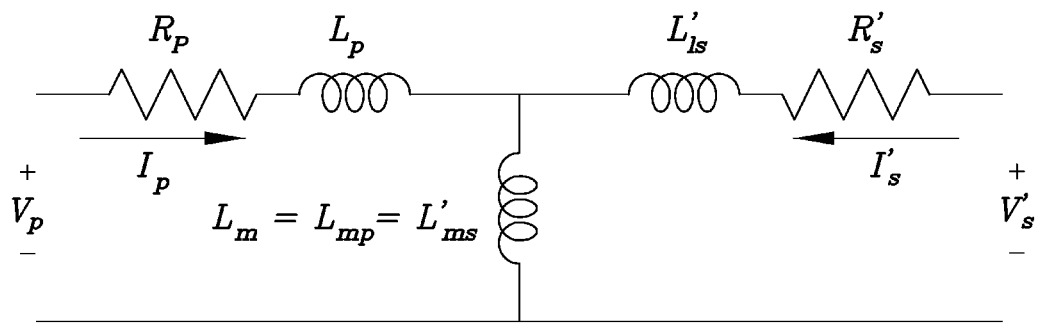

FIGS. 5 and 6 are exemplary circuit diagrams showing modeling of a transformer in a charging system without a power factor correction circuit according to an exemplary embodiment of the present disclosure. In particular, FIG. 5 is a diagram showing modeling of a primary-side (e.g., battery side) coil and a secondary-side (e.g., rectifying circuit side) coil of a transformer of a winding synchronous motor according to an exemplary embodiment of the present disclosure. Further, FIG. 6 is an exemplary circuit diagram shown by converting parameters to a primary side (e.g., battery side) in consideration of a winding ratio of a primary-side (e.g., battery side) coil and a secondary-side (e.g., rectifying circuit side) coil of a transformer model shown in FIG. 5.

In the models shown in FIGS. 5 and 6, each parameter may be defined as follows: $n_p$ denotes the number of windings of primary side (battery side) coil; $cn_s$ denotes the number of windings of secondary-side (rectifying circuit side) coil; $R_p$ denotes a winding resistance component of primary-side coil; $L_{lp}$ denotes a leakage inductance component of primary-side coil; $L_{mp}$ denotes a mutual inductance component of primary-side coil; $R_s$ denotes a winding resistance component of secondary-side coil; $L_{ls}$ denotes a leakage inductance component of secondary-side coil; $L_{ms}$ denotes a mutual inductance component of secondary-side coil; $L_{ls}'$ denotes a leakage inductance component of secondary-side coil converted to the primary side [$L_{ls}'=(n_p/n_s)2*L_{ls}$]; $R_s'$ denotes a winding resistance component of secondary-side coil converted to the primary side [$Rs'=(n_p/n_s)2*R_s$]; $V_p$ denotes a voltage across primary-side coil; $V_s$ denotes a voltage across secondary-side coil; $V_s'$ denotes a voltage across the secondary-side coil converted to the primary side [$V_s'=(n_p/n_s)*V_s$]; $I_p$ denotes a primary-side coil current; $I_s$ denotes a secondary-side coil current; and $I_s'$ denotes a secondary-side coil current converted to the primary side [$I_s'=(n_s/n_p)*I_s$].

A voltage $V_{dc}$ at a connection end (e.g., dc terminal) of the high frequency switching circuit 21 connected to the secondary-side (e.g., rectifying circuit side) coil of the transformer 22 and the rectifying circuit 11 may be varied based on the grid voltage Vg. Therefore, when the grid voltage Vg has a value of zero or a value similar to zero, control of the output provided to the battery 30 by adjusting the voltage ($V_s$ or $V_s'$) across the secondary-side (rectifying circuit side) coil may be difficult. In particular, an exemplary embodiment of the present disclosure may enable an output the voltage $V_s$ or $V_s'$ across the secondary-side (e.g., rectifying circuit side) coil at the maximum, and may operate a battery power by controlling the voltage $V_p$ across the primary-side (e.g., battery side) coil in accordance with the voltage $V_s$ or $V_s'$ across the secondary-side (e.g., rectifying circuit side) coil.

The voltage across the secondary-side (e.g., rectifying circuit side) coil may be expressed by following Equation 1.

$$V_s' = E_s' \sin(\omega_f t) = V_{dc}\frac{n_p}{n_s}\sin(\omega_g t) \quad \text{Equation 1}$$

In the Equation 1, $E_s$ is the peak value of the grid voltage, $E_s'$ is the grid voltage peak value [$E_s'=(n_p/n_s)*E_s$] converted to the primary side, and $\omega_f$ is the operating frequency [rad/s] of the high frequency switching circuit, and $\omega_g$ is the frequency [rad/s] of the grid voltage.

In particular, the current flowing in the secondary-side (e.g., rectifying circuit side) coil, the voltage of the primary-side (e.g., battery side) coil, and the current flowing in the primary-side coil may be expressed by sine and cosine components.

$$I_s'=I_{ss}\sin(\omega_f t)+I_{sc}\cos(\omega_f t)$$
$$V_p=E_{ps}\sin(\omega_f t)+E_{pc}\cos(\omega_f t)$$
$$I_p=I_{ps}\sin(\omega_f t)+I_{pc}\cos(\omega_f t) \quad \text{Equation 2}$$

In Equation 2, $I_{ss}$ is a peak value of sine component in $I_s'$. $I_{sc}$ is a peak value of cosine component in $I_s'$. $E_{ps}$ is a peak value of sine component in $V_p$. $E_{pc}$ is a peak value of cosine component in $V_p$. $I_{ps}$ is a peak value of sine component in $I_p$. $I_{pc}$ is a peak value of cosine component in $I_p$.

For example, in the structure of the circuit shown in FIG. 6, the voltage of the primary-side (e.g., battery side) coil and the voltage of the secondary-side (e.g., rectifying circuit side) coil may satisfy the following Equation 3.

$$V_p=R_p I_p+p(L_{lp}I_p+L_m(I_p+I_s'))$$
$$V_s'=R_s'I_s'+p(L_{ls}'I_s'+L_m(I_p+I_s')) \quad \text{Equation 3}$$

When the voltage of the secondary-side (e.g., rectifying circuit side) coil is determined in accordance with the above Equation 1, the parameters of the Equation 2 for obtaining the desired output $P_s$ may be set as following Equation 4 from the Equation 3.

$$aI_{ss}^2 + bI_{ss} + c = 0 \quad \text{Equation 4}$$

-continued $$I_{ss} = \frac{-b - \sqrt{b^2 - 4ac}}{2a}$$

$$a = (2 - k_{pf}^2)\left(R_s' + \frac{R_p}{(\omega_f L_m)^2}(R_s'^2 + (\omega_f L_s')^2)\right)$$

$$b = \left(-\sqrt{1-k_{pf}^2}\frac{2E_s'R_p\omega_f L_s'}{(\omega_f L_m)^2} - \frac{2E_s'R_pR_s'}{(\omega_f L_m)^2} - E_s'\right)$$

$$c = \frac{R_p E_s'^2}{(\omega_f L_m)^2} - \frac{4}{3}P_s$$

$$I_{sc} = -\sqrt{1-k_{pf}^2}\, I_{ss}$$

$$I_{ps} = -\frac{R_s'I_{sc} + I_{ss}\omega_f L_s'}{\omega_f L_m}$$

$$I_{pc} = \frac{R_s'I_{ss} - \omega_f L_s'I_{sc} - E_s'}{\omega_f L_m}$$

In particular, $k_{pf}$ denotes a power factor of the high frequency component generated by the high frequency switching circuits 21 and 23, and may be independent of the power factor of the grid so that it may be efficiently set based on a copper loss of the transformer 22. In other words, $k_{pf}$ may be the power factor (e.g., phase difference) of the high frequency voltage generated by the high frequency switching circuit, and may be determined by calculating a value of $k_{pf}$ to cause $V_p*I_p$ (e.g., charge power) to be maximized for $V_p$ and $V_s'$ in the Equation 4. This may be determined by obtaining an optimal solution through experimental repetition.

Since the charging system without a power factor correction circuit according to the exemplary embodiment of the present disclosure may be connected to the grid 40 having a single phase, when the power factor of the grid current is close to one, the power having twice the grid frequency may be input. Additionally, with the charging system without a power factor correction circuit according to the exemplary embodiment of the present disclosure, when the capacity of the capacitor 12 connected to the secondary side is minimized, the power input to the secondary-side (e.g., rectifying circuit side) coil may be identical to the power $P_s$ provided input to the primary-side (e.g., battery side) coil without a change. Accoridngly, the input power may be adjusted by adjusting the power $P_s$, and a shape of the grid current may be determined by changing the power $P_s$ to have twice the grid frequency. In other words, a power factor and harmonics of the grid may be eliminated.

Figure 7:
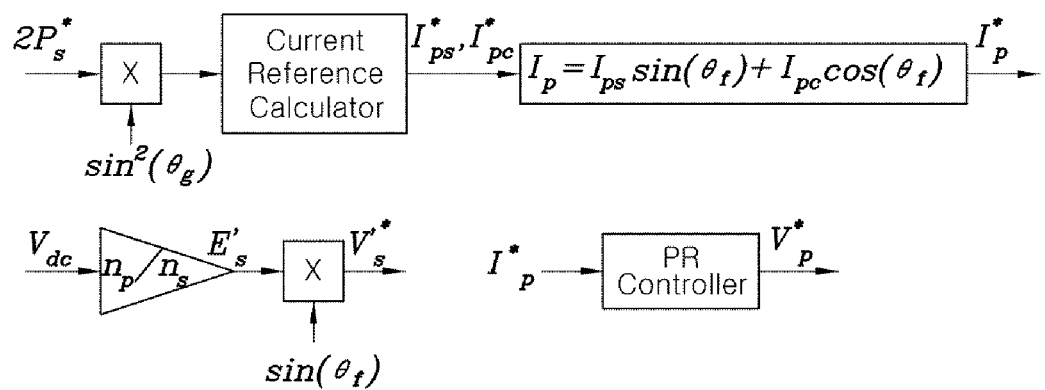
FIGS. 7 and 8 are exemplary control block diagrams illustrating control operations of a charging system without a power factor correction circuit according to an exemplary embodiment of the present disclosure.

A control block diagram for calculating the current command and the voltage command based on the Equation 4 is shown in FIG. 7. To obtain $I_{ss}$, $I_{sc}$, $I_{ps}$, and $I_{pc}$, all parameters in the Equation 4 must be known. The remaining parameters including $k_{pf}$ may be preset, and a charge power command value $P_s*$ may be a command value input from a host controller. The command value may be input to the controller 50 to allow a voltage command value $V_p*$ to be determined for the high frequency switching circuit 23 to generate the current $I_p$ calculated by the Equation 4. The control operation as described above may be performed in the controller 50.

In particular, the controller 50 may be input with the charge power command value $P_s*$ from the host controller to generate $I_{ss}$, $I_{sc}$, $I_{ps}$, and $I_{pc}$ by inputting the charge power command value $P_s*$ and various parameters in the Equation 4. Using the generated values $I_{ss}$, $I_{sc}$, $I_{ps}$, and $I_{pc}$, the controller 50 may be configured to determine the charge voltage command value $V_p*$ to allow actual charge current to follow the charge current command value $I_p^*$ through a PR control. The controller 50 may be configured to adjust a switching duty of the high frequency switching circuit 23 to allow the voltage of the primary-side (e.g., battery side) coil of the transformer 22 to be the charge voltage command value $V_p^*$. Further, the controller 50 may be configured to generate the voltage command value $V_s^*$ of the secondary-side (e.g., grid side) coil of the transformer 22 using the Equation 1, and may be configured to adjustthe switching duty of the high frequency switching circuit 23 to allow the voltage of the secondary-side (e.g., grid side) coil to be the command value $V_s^*$.

Figure 8:
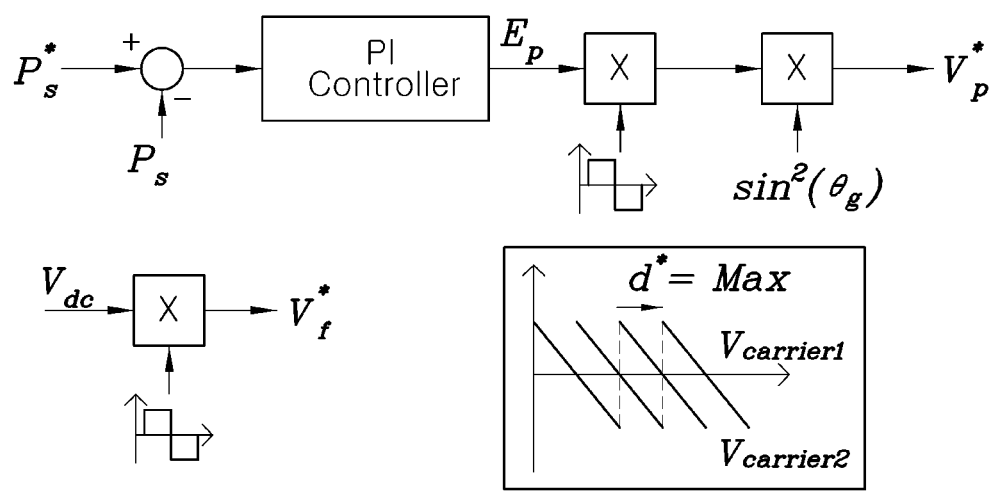

FIG. 8 is an exemplary control block diagram illustrating another control operation of the charging system without a power factor correction circuit according to the exemplary embodiment of the present disclosure. A high frequency sinusoidal wave may be used when the high frequency is less than approximately 10 times the switching frequency of the high frequency switching circuit. A square wave may be injected to apply a higher frequency, and the frequency may be increased up to the maximum switching frequency. This method is often used in a DAB system, and all of the values used for power computation take into consideration only the fundamental wave component of a square wave, but there may be many errors for power computation considering only fundamental wave since square wave includes many components of higher frequencies in a case of the square wave. However, a magnitude of the power may be adjusted by varying a magnitude of the voltage or a phase of a pulse width modulation (PWM) carriers of both sides and may be expressed as following Equation 5.

$$P_s \approx \frac{V_p V_s'}{2L_{lt}F_s}d(1-d) \quad \text{Equation 5}$$

In Equation 5, $L_{lt}$ denotes a sum of leakage inductances of the primary side and the secondary side of the transformer. $F_s$ denotes a switching frequency, and d denotes a delay ratio of the PWM carriers of both sides. In other words, d may be a value obtained by dividing a carrier phase difference of both sides by $2\pi$, and may be adjusted at about $-0.25 < d < 0.25$.

With a control method shown in FIG. 8, a maximum voltage may be output as in the control method of FIG. 7 in the secondary side, and a magnitude of the voltage may be adjusted to obtain the desired power in the primary side. For example, although the desired power may be obtained by adjusting d as described above, it is intended that an exemplary embodiment of the present disclosure uses a method of changing he primary-side voltage $V_p$ in a state that maintains a value of d at the maximum.

When the output power has twice the grid frequency, (e.g., the high frequency), the primary-side voltage may be adjusted to have twice the grid frequency. To generate a square-wave voltage of the switching frequency, each of the switching frequencies may be alternately multiplied by 1 and −1 to output a desired square wave. Since the output power may have an error different from a sine wave, a proportional integral (PI) controller may be applied to output the desired power. The secondary-side voltage varies in accordance with a magnitude of a voltage across the capacitor 12 to output the maximum voltage.

As described above, an exemplary embodiment of the present disclosure may be implemented as a charging system having a simple structure compared to the conventional charging system. Accordingly, a power factor and a distortion factor that are necessary for the grid by operating the high frequency transformer system may be applied. Therefore, according to the present disclosure, since the charging system may be directly connected to the single phase grid without an additional filter and a capacitor of minimal capacity may be used as a capacitor to form the DC voltage, advantages in a view of cost, size, weight, and reliability of the overall system may be attained when compared with the existing system.

While the present disclosure has been particularly shown and described with reference to exemplary embodiments thereof, it will be understood by those skilled in the art that various changes in form and details may be made therein without departing from the spirit and scope of the disclosure as hereinafter claimed.

What is claimed is:

1. A charging system without a power factor correction circuit, comprising:
   a rectifying circuit configured to rectify a grid power;
   a converter configured to receive a voltage-current rectified by the rectifying circuit and convert the voltage-current into a charge voltage-current to be provided to a battery; and
   a capacitor connected across a connection end of the rectifying circuit and the converter,
   wherein the converter includes a first high frequency switching circuit configured to convert the voltage-current rectified by the rectifying circuit into a high frequency signal, a transformer having a secondary-side coil that receives the high frequency signal converted by the first high frequency switching circuit and a primary-side coil electromagnetically coupled to the secondary-side coil configured to derive and output the high frequency signal applied to the secondary-side coil based on a winding ratio, and a second high frequency switching circuit configured to convert the high frequency signal derived by the primary-side coil into a low frequency to be provided to the battery,
   wherein the charging system further comprising a controller configured to operate switching duties of the first high frequency switching circuit and the second high frequency switching circuit, and
   wherein the controller is configured to operate the first high frequency switching circuit to determine a voltage of the secondary-side coil as an equation of:

$$V_s' = E_s'\sin(\omega_f t) = V_{dc}\frac{n_p}{n_s}\sin(\omega_g t)$$

wherein $V_s$ is a voltage across the secondary-side coil, $V_s'=(n_p/n_s)^*V_s$, $n_p$ is the number of windings of the primary-side coil, $n_s$ is the number of windings of the secondary-side coil, $V_{dc}$ is a voltage across the capacitor, $E_s$ is a peak value of a grid voltage, $E_s'=(n_p/n_s)^*E_s$, $\omega_f$ is an operating frequency [rad/s]of the first high frequency switching circuit, and $\omega_g$ is a frequency [rad/s]of the grid voltage.

2. The charging system of claim 1, wherein each of the first high frequency switching circuit and the second high frequency switching circuit is a full-bridge circuit having a plurality of switching elements.

3. The charging system of claim 1, wherein the capacitor is a film capacitor.

4. The charging system of claim 1, wherein the controller is configured to receive a charge power command value $P_s$ from a host controller and derives $I_{ss}$, $I_{sc}$, $I_{ps}$, and $I_{pc}$ by applying the charge power command value $P_s$ and a predefined power factor $K_{pf}$ of a high frequency component generated by the first high frequency switching circuit to an equation of:

$$aI_{ss}^2 + bI_{ss} + c = 0$$

$$I_{ss} = \frac{-b - \sqrt{b^2 - 4ac}}{2a}$$

$$a = (2 - k_{pf}^2)\left(R_s' + \frac{R_p}{(\omega_f L_m)^2}(R_s'^2 + (\omega_f L_s')^2)\right)$$

$$b = \left(-\sqrt{1 - k_{pf}^2}\,\frac{2E_s'R_p\omega_f L_s'}{(\omega_f L_m)^2} - \frac{2E_s'R_pR_s'}{(\omega_f L_m)^2} - E_s'\right)$$

$$c = \frac{R_p E_s'^2}{(\omega_f L_m)^2} - \frac{4}{3}P_s$$

$$I_{sc} = -\sqrt{1 - k_{pf}^2}\, I_{ss}$$

$$I_{ps} = -\frac{R_s' I_{sc} + I_{ss}\omega_f L_s'}{\omega_f L_m}$$

$$I_{pc} = \frac{R_s' I_{fs} - \omega_f L_s' I_{sc} - E_s'}{\omega_f L_m}$$

wherein $R_p$ is a resistance component of the primary-side coil, $L_m$ is a mutual inductance components of the primary-side coil and the secondary-side coil, $R_s$ is a winding resistance component of the secondary-side coil, $R_s'$ is a winding resistance component of the secondary-side coil converted to a primary side [Rs'= $(n_p/n_s)2*R_s$], $V_s'$ is the voltage across the secondary-side coil converted to the primary side [$V_s'=(n_p/n_s)*V_s$], $I_s$ is a secondary-side coil current, $I_s'$ is a secondary-side coil current converted to the primary side [$I_s'=(n_s/n_p)*I_s$], $I_{ss}$ is a peak value of a sine component in $I_s'$, $I_{sc}$ is a peak value of a cosine component in $I_s'$, $I_p$ is a primary-side coil current, $I_{ps}$ is a peak value of a sine component in $I_p$, and $I_{pc}$ is a peak value of a cosine component in $I_p$.

5. The charging system of claim 4, wherein the controller is configured to generate a charge current command value for charging the battery using the determined $I_{ps}$ and $I_{pc}$, and adjust the switching duty of the second high frequency switching circuit to operate the voltage of the secondary-side coil of the transformer to allow a charge current that corresponds to the charge current command value to be applied to the battery.

6. The charging system of claim 1, wherein the controller configured to maintain a carrier phase difference of the first high frequency switching circuit and the second high frequency switching circuit at a maximum carrier phase difference, adjust the voltage of the primary-side coil of the transformer to have twice a grid frequency, and outputs a square wave by alternately multiplying 1 and −1 for each switching frequency of the second high frequency switching circuit to generate a voltage command value of the primary-side coil of the transformer.

7. The charging system of claim 1, wherein the transformer is a winding synchronous motor having a stator coil as the primary winding and a field coil as the secondary winding.

8. The charging system of claim 7, further comprising a relay configured to electrically insulate the battery and the bridge circuit connected to the field coil when the battery is charged.

* * * * *